(12) United States Patent
Barnes

(10) Patent No.: US 6,426,053 B1
(45) Date of Patent: Jul. 30, 2002

(54) HYBRID OZONE GENERATOR

(76) Inventor: Ronald L. Barnes, #74 Revere Way, Huntsville, AL (US)

( * ) Notice: Subject to any disclaimer, the term of this patent is extended or adjusted under 35 U.S.C. 154(b) by 10 days.

(21) Appl. No.: 09/717,904

(22) Filed: Nov. 20, 2000

Related U.S. Application Data

(60) Provisional application No. 60/166,255, filed on Nov. 18, 1999.

(51) Int. Cl.$^7$ ................................................ B01J 19/08
(52) U.S. Cl. .............................. 422/186.3; 422/186.07; 422/186.15
(58) Field of Search ................ 422/186.13, 186.07, 422/186.15

(56) References Cited

U.S. PATENT DOCUMENTS 5,223,105 A * 6/1993 Arthurson .................. 204/176

FOREIGN PATENT DOCUMENTS

JP 54-135692 A * 10/1979

* cited by examiner

*Primary Examiner*—Kishor Mayekar
(74) *Attorney, Agent, or Firm*—Mark Clodfelter

(57) ABSTRACT

An ozone generator utilizing an ultraviolet light tube for generating ozone is disclosed. In this ozone generator, efficiency in converting oxygen to ozone is increased by imposing an electrical field around the light tube. This electrical field causes a theta pinch in the plasma of the light tube, increasing luminescence in the ultraviolet spectral range and exciting diatomic oxygen molecules passing through the electrical field. Thus excited, the diatomic oxygen is easier to disassociate and become converted to ozone.

15 Claims, 4 Drawing Sheets

HYBRID OZONE GENERATOR

This application claims priority from Provisional application Ser. No. 60/166,255, filed Nov. 18, 1999.

FIELD OF THE INVENTION

This invention relates to ozone generators, and particularly to an ozone generator using a hot cathode tube wherein efficiency of the generator is increased by exciting oxygen flowing past the tube and mercury plasma within the tube is electromagnetically pinched in order to increase efficiency of the ozone generator.

BACKGROUND OF THE INVENTION

Ozone generators utilizing mercury plasma tubes are well known. In these ozone generators, a transparent containment tube similar to a conventional fluorescent tube contains a mercury gas that when ionized by an electrical potential, becomes an electrically conductive plasma. This plasma emits ultraviolet light at one wavelength, 185 nanometers, that disassociates diatomic oxygen into atomic oxygen, each atom of which then combines with a molecule of diatomic oxygen to form an ozone molecule (O3). However, the mercury plasma also emits ultraviolet light at a wavelength of 254 nanometers, which tends to break down the ozone molecule, which then reverts back to diatomic oxygen. Since slightly more ozone is created than destroyed in a flow of oxygen (or air containing oxygen) past the plasma containment tube, the net result is that these type ozone generators typically generate about 500 parts per million of ozone in an airflow of about 1 liter/minute. In addition, the mercury plasma tubes used in ozone generators are operated at much higher power levels than a conventional fluorescent tube, which in turn generates higher operating temperatures of components of the containment tube. Contributing to this, during operation the plasma reaches to the inner walls of the containment tube, where many electrons impinge on the walls and lose energy, which increases losses. Because of heating from the increased power levels and the described losses, mercury plasma containment tubes are typically constructed of quartz, which requires a more expensive fabrication process than a conventional glass tube. Additionally, while high quality quartz readily passes ultraviolet radiation and glass generally blocks ultraviolet radiation, very thin glass tubes could be used where heating of the tube is not great. Such glass tubes would be much less expensive than conventional quartz tubes. Further, the components of the ozone generator holding a conventional quartz containment tube and components immediately surrounding the tube must be of heat resistant materials.

In view of the foregoing, it is one object of the invention to increase efficiency of an ultraviolet light ozone generator. It is another object of the invention to reduce operating temperatures of such an ozone generator. Yet another object of the invention is to reduce operational power requirements of the ozone generator. Other objects of this invention will become apparent upon a reading of the appended specification.

SUMMARY OF THE INVENTION

This invention is a hybrid ozone generator that utilizes ultraviolet light from a cold or hot cathode tube to produce ozone. An electrical field is disposed around the tube, the electrical field pumping energy into oxygen flowing past the tube. In addition, a theta pinch is performed on the plasma in the tube, causing an increase of radiation from the plasma. These effects together serve to increase efficiency of the ozone generator and allow more ozone to be generated while allowing the plasma containment tube to operate at lower temperatures.

DETAILED DESCRIPTION OF THE DRAWINGS

In a conventional mercury plasma tube used to generate ozone, mercury gas, in conjunction with small amounts of pening gasses such as neon and argon used to initiate the ionization upon energizing the tube, becomes a plasma and conducts electrons from end-to-end and across the width between the inner walls of the tube. As stated, electrons in the plasma impinge inner surfaces of these walls, heating the walls and contributing to overall losses in the system. In order to increase efficiency of these ozone-generating tubes, Applicant provides an ozone generator of the ultra-violet type wherein the plasma containment tube or tubes are substantially surrounded by magnetic and electrical fields that causes plasma to be repelled from walls of the tube and electrons in the plasma to be accelerated. Such fields, when properly oriented, increase luminescence of the mercury plasma in the ultraviolet spectral ranges, thereby causing increased disassociation of diatomic oxygen which in turn promotes formation of ozone. A further boost in efficiency is realized due to the electrical field around the tube exciting diatomic oxygen molecules flowing past the tube, allowing them to be disassociated more readily by the ultraviolet radiation. Here, when the oxygen molecules are excited to higher energy levels by the 254 wavelength ultraviolet radiation, they begin to be broken down by the 254 ultraviolet wavelength, further increasing efficiency of the tube. The plasma tube or tubes of Applicant's invention may be mounted in a generally airtight housing, with a flow of air from an inlet being driven, as by a small compressor, or drawn, as by a venturi device, past the tube or tubes and out an outlet.

Figure 1:
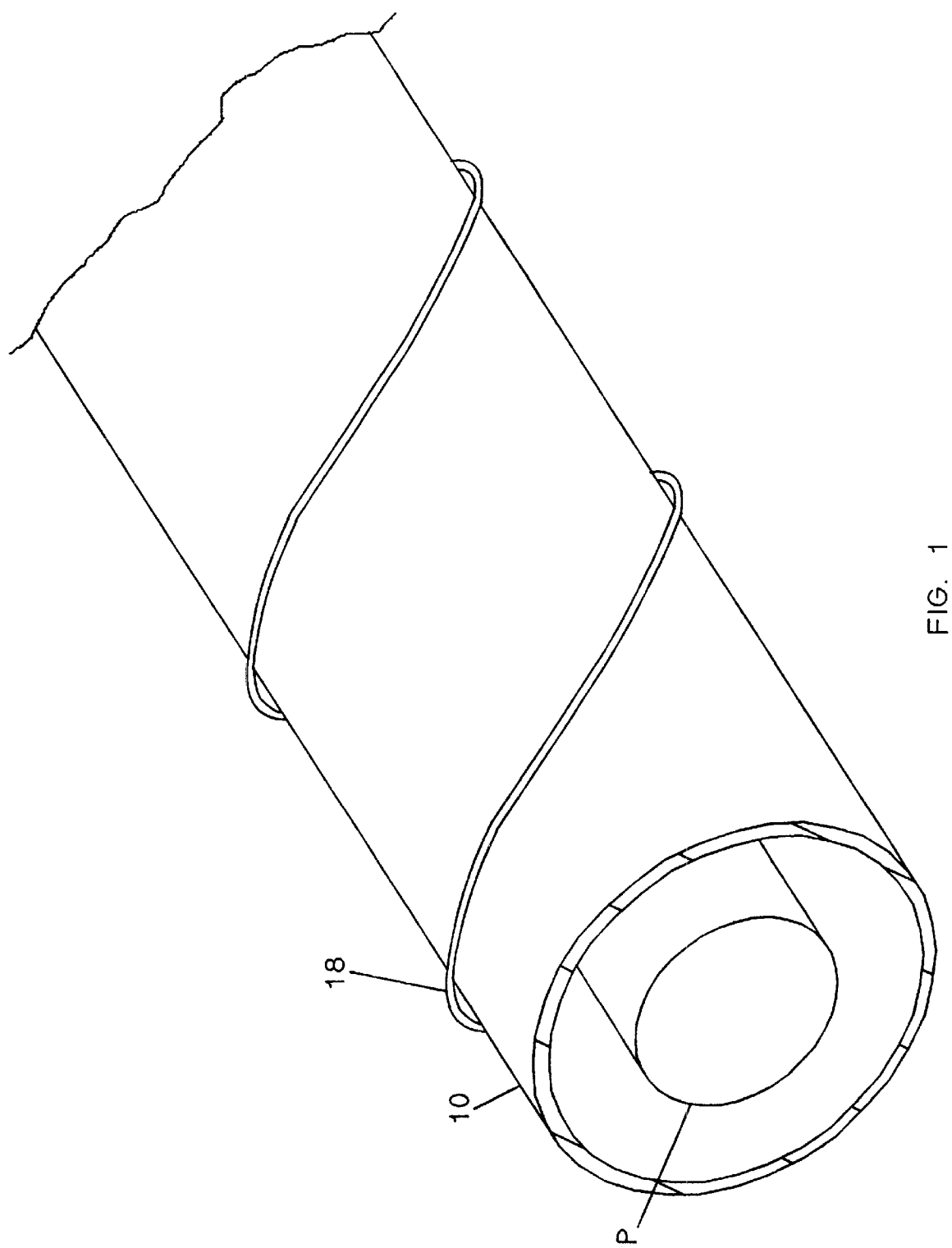
FIG. 1 is a cut-away view of a mercury plasma tube showing details of the instant invention.

In order to accomplish the increased efficiency, and referring to FIG. 1, an electrical conductor 18 is shown wrapped around the exterior of a mercury plasma containment tube 10, which may be either the hot or cold cathode type, shown cut away. A potential is applied to conductor 18 such that at any point in time, the electrical field developed by the conductor pinches the plasma into a smaller volume P than the inner confines of the walls of the containment tube. This type of electrical field is commonly known as a "theta pinch". Such a pinch maintains the plasma within the volume P away from the walls of the containment tube, reducing or eliminating losses due to contact of the plasma with the walls of the tube. In addition, the magnetic field developed by conductor 18 causes electrons in the plasma to be accelerated and spiral about the magnetic field lines therein, causing increased luminescence of the mercury plasma in the ultraviolet spectral ranges.

Figure 2:
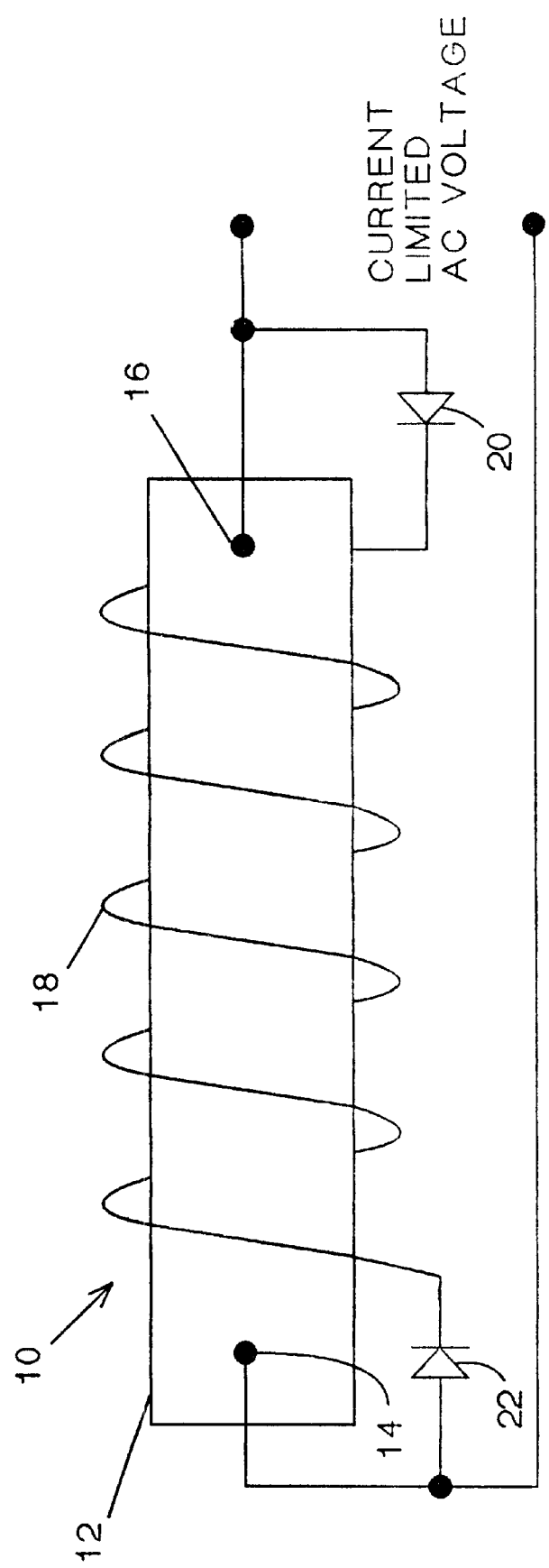
FIG. 2 is a partially schematic, partially block diagram of the instant invention.
Figure 3:
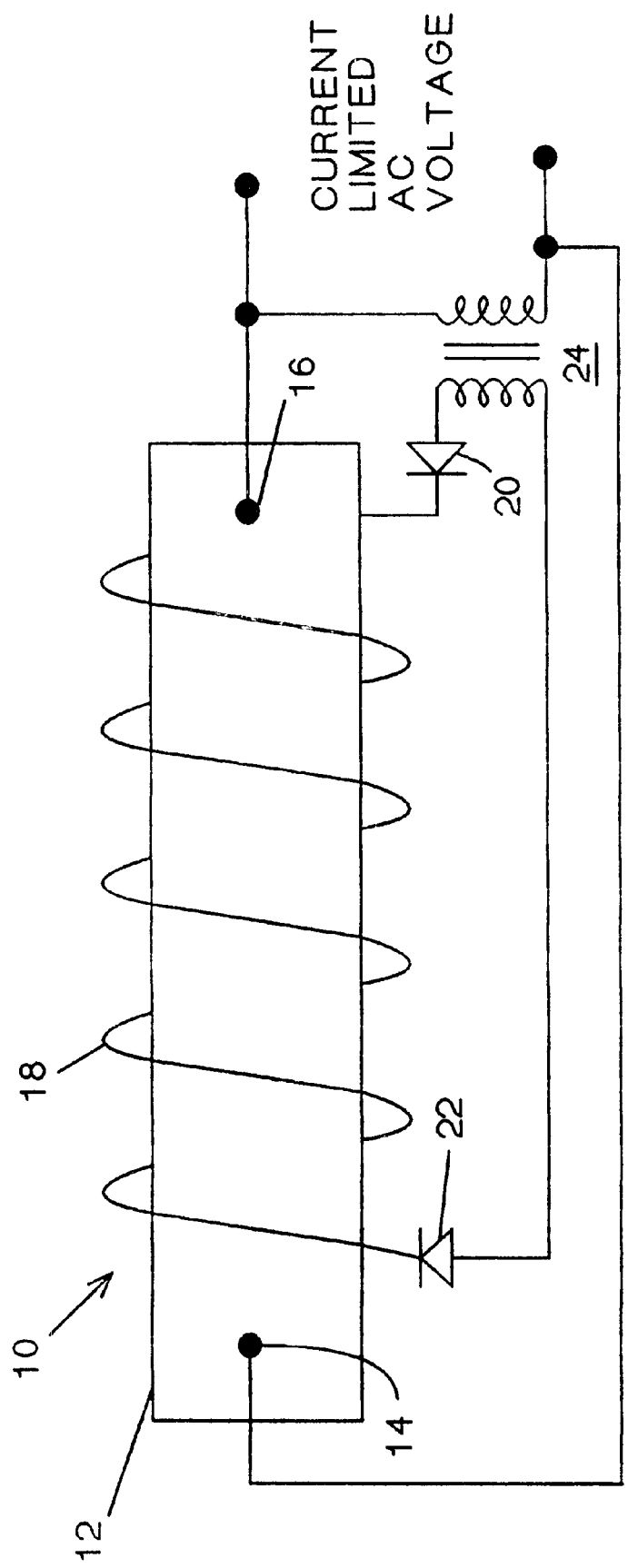
FIG. 3 is a partially schematic, partially block diagram of the instant invention.
Figure 4:
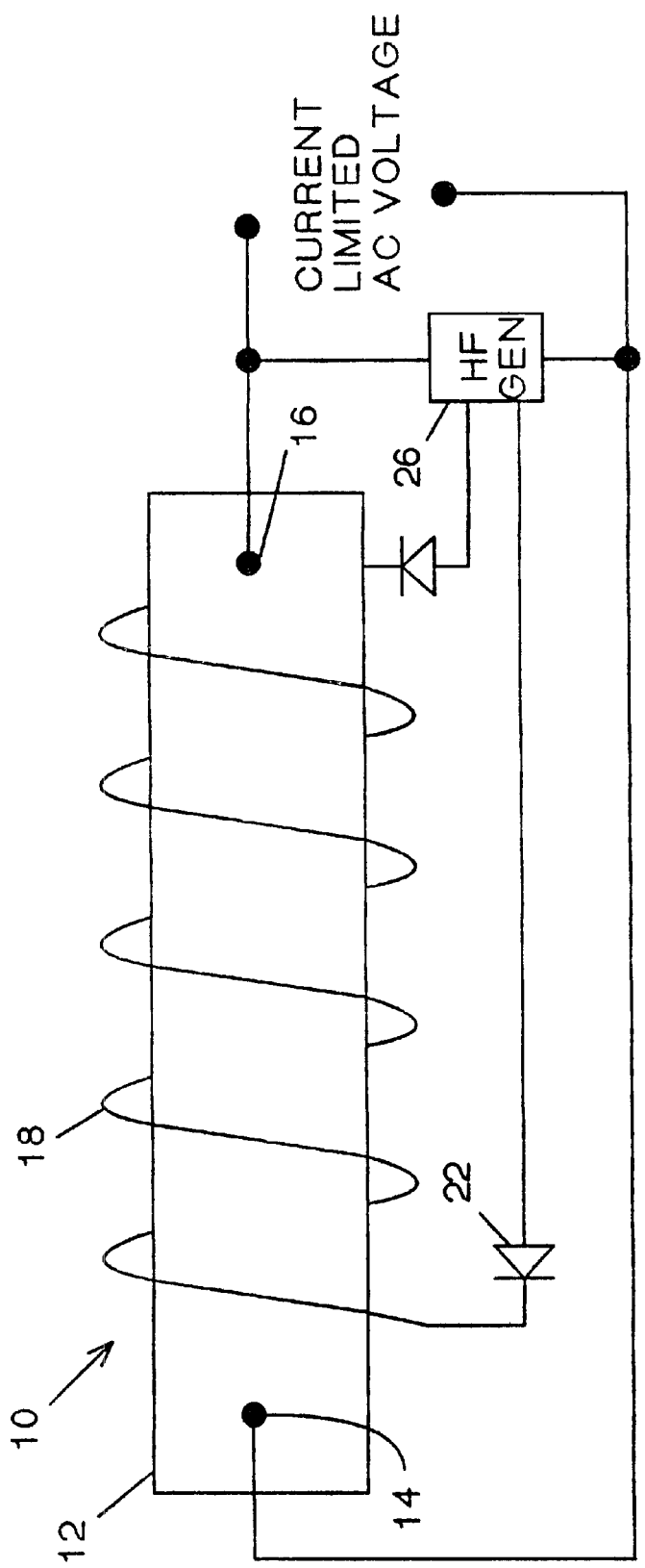
FIG. 4 is a partially schematic, partially block diagram of the instant invention.

Referring now to FIGS. 2, 3 and 4, electrically powered plasma theta pinch tubes of the present invention are shown.

The tube portion 10 of these ozone generators may be conventional, electrically powered ultraviolet tubes used in the production of ozone. In these tubes (schematically illustrated), a fused quartz envelope 12 contains an elemental mercury vapor that is the primary source of plasma. While fused quartz tubes are disclosed, where it is discovered that the tubes operate at a substantially lower temperature due to the theta pinch effect, the containment tubes may be constructed of a lower temperature material, such as a thin glass-type material. Here, since electrons are repelled away from the inner walls of the containment tube by the theta pinch, losses from electrons impinging on the inner walls of the tube are minimized or eliminated. A pair of electrodes 14, 16 at opposite ends of the tube expose the operational, current limited electrical potential to the gasses in the tube. These electrodes are energized by application of an initially high potential thereto, which may be about 200 volts or so, this initial potential ionizing the pening gasses, which in turn ionizes the mercury vapor, causing current to flow through the mercury plasma. As current begins to flow through the tube, the electrical potential drops to about 50 volts or so due to the current limited source. As stated, this mercury plasma radiates at spectral frequencies of 185 nanometers and 254 nanometers, with the 254 nanometer emission being approximately 100 times stronger than the 185 nanometer emission. Typically, ozone is generated by the 185 nanometer emission and destroyed by the 254 nanometer emission, meaning that a significant quantity of ozone generated by the tube is destroyed. In order to overcome this drawback, ultraviolet ozone generators rely on a flow of gas through an area surrounding the tube in order to exhaust the ozone quickly before it is destroyed.

As described above, Applicant proposes to increase efficiency of these tubes by imposing an electrical field around the tube in order to produce a theta pinch within the tube. In this effect, an electrical field is generated around and in the tube so as to squeeze the plasma into a smaller volume P along the axis of the tube. Additionally, the imposed electrical and magnetic fields serve to accelerate electrons moving through the plasma, with these accelerated electrons moving with a tight spiral motion about the magnetic field lines in the containment tube. The resulting additional collisions between the accelerated electrons and mercury ions thus develop higher energy levels, heating the plasma to a higher temperature that otherwise would occur. In turn, this hotter plasma radiates with a greater intensity, converting a greater number of oxygen molecules outside the tube to ozone.

For developing the theta pinch in the cathode tube, and as shown in FIGS. 2, 3, and 4, a conductor 18 is wound or otherwise configured around tube 12. This conductor 18 may be a wire, insulated as by Teflon™. Since the ultraviolet light must escape the tube in order to generate ozone, there must be gaps in the winding of conductive wire 18. Here, a rate of winding of about 1 to 6 or 8 or so turns of wire per inch of tube 10 allows sufficient light to escape to increase efficiency of ozone. Of course, where a thinner wire or a transparent conductive material is used, the number of turns per inch may be higher. In FIG. 2, coil 18 is insulated, as by Teflon™, and is energized by a potential developed by the AC power source, which may be the conventional ballast used to drive the plasma tube, and rectified by diodes 20, 22. Diodes 20, 22 are poled so that no significant current flows through conductor 18. However, an electrical field is developed around tube 12 with each half cycle of AC power, providing the desired theta pinch. Thus, there are only very minimal additional power requirements to drive conductor 18.

In the embodiment of FIG. 3, a step-up transformer 24 is used to increase the voltage in order to enhance the theta pinch. Transformer 24 may be sized so that the potential is anywhere from slightly higher than the power supply voltage to about 5000 volts or so. Here, higher voltages serve to increase energization of oxygen flowing around the tube, making it easier to disassociate.

FIG. 4 shows an embodiment wherein a high frequency generator 26 provides a train of high frequency pulses to diodes 20, 22. These pulses may be of a frequency from about 10 kHz up to a practical limit of 2–3 gHz or so.

Particularly in this embodiment, the rapidly pulsed electrical field has more of a pumping effect on oxygen flowing past the containment tube, which as stated, excites electrons in the diatomic oxygen, allowing for easier disassociation of the diatomic molecule. With the electrons of the diatomic oxygen in this excited state, the 254 wavelength of infrared radiation from the plasma, which normally destroys ozone, also begins to disassociate diatomic oxygen, further increasing efficiency of the ozone generator. Where electromagnetic interference is a concern, the ozone generator may be shielded by being enclosed in a metallic housing constructed of or covered by materials conventionally used for electromagnetic shielding purposes.

In any of the above embodiments, where a typical ultraviolet ozone generator develops about 500 parts per million of ozone at 1 liter per minute airflow past the containment tube, it has been found that with Applicants theta pinch, the output of ozone increases to about 700 or so parts per million or more, depending on power, frequency and voltage applied to the winding. In addition, in all the described embodiments, oxygen exposed to the electrical field is excited, and is thus easier to disassociate.

While the instant invention discloses a helical, electrically conductive winding around the containment tube in order to induce a magnetic field therein, other ways of providing such a magnetic field may be implemented. For instance, the helical winding may be located within the containment tube. In this instance, it would probably be unnecessary to electrically insulate the winding. Further, magnets or electromagnets disposed for generating a toroidal magnetic field may be used, with the tube centered in the toroidal field. No special or particularized housing would be needed for an ozone generator utilizing Applicant's theta pinch, except as stated in the instance where electromagnetic shielding is necessary. Also, power for the theta pinch may be derived from a separate power supply independent from the power supply used to power the ultraviolet tube. Here, the electrical field may be stronger than a field produced by the current limited field used to power the ultraviolet tube. Further, the electrical fields for the theta pinch and for exciting oxygen may be independent of each other, and where it is discovered that one or the other of the electrical fields is more efficient than the other, the electrical field having the weaker effect may be omitted.

Having thus disclosed my invention and the manner of its use, it should be apparent that incidental changes may be made thereto that fairly fall within the scope of the following appended claims, wherein I claim:

1. A system for producing ozone comprising:
an ultraviolet illumination tube having electrical terminals at each end and configured to develop a plasma therebetween, said plasma emitting wavelengths in the ultraviolet spectrum that disassociate oxygen around the tube,
a power supply coupled to said terminals, said power supply configured to develop a potential and current source sufficient to develop said plasma, and an electrical field-producing device configured to develop an electrical field around said plasma and around an exterior of said tube, said electrical field repelling said plasma away from inner walls of said tube and energizing said oxygen around the tube.

2. A system as set forth in claim 1 wherein said electrical field-producing device is a winding of at least one conductor for developing said electrical field so that when said electrical potential is applied to said conductor, said electrical field is developed.

3. A system as set forth in claim 2 wherein said winding is energized by said power supply for said ultraviolet illumination tube.

4. A system as set forth in claim 3 wherein said potential energizing said winding is of an approximate potential to said potential for developing said plasma.

5. A system as set forth in claim 3 wherein said potential energizing said winding is different from said potential for developing said plasma.

6. A system as set forth in claim 5 wherein said potential energizing said winding may be up to approximately 5,000 volts.

7. A system as set forth in claim 3 further comprising a pulse generator for developing a train of pulses, said pulse generator being coupled to said conductor for repelling said plasma away from said inner walls of said tube and energizing said oxygen around said tube.

8. A system as set forth in claim 7 wherein a frequency of said pulses may be up to a frequency of approximately 3 gigaHertz.

9. An ozone generator comprising:

an ultraviolet tube having an electrode at each end for receiving a first electrical potential sufficient to maintain a plasma within said tube, said plasma emitting ultraviolet radiation sufficient to disassociate diatomic oxygen flowing past said tube, an electrical power supply coupled to each said electrode, an electrical conductor configured as a winding around said tube so that a second electrical potential applied to said conductor configures an electrical field in said tube and around said tube, wherein said plasma is squeezed into a smaller volume than a volume of said tube, causing an increase of sad ultraviolet radiation from said plasma, said electrical field configured to excite said diatomic oxygen flowing around said tube, causing increased disassociation of said diatonic oxygen by said ultraviolet radiation.

10. An ozone generator as set forth in claim 9 wherein said electrical conductor is coupled to said electrical power supply.

11. An ozone generator as set forth in claim 10 further comprising a rectifier at each end of said conductor, each said rectifier oppositely poled so that only said second electrical potential, with no significant current flow, is applied to said conductor.

12. An ozone generator as set forth in claim 11 wherein said first electrical potential and said second electrical potential are similar.

13. An ozone generator as set forth in claim 11 wherein said second electrical potential is greater than said first electrical potential.

14. An ozone generator as set forth in claim 13 wherein said electrical potential is up to approximately 5000 volts.

15. An ozone generator as set forth in claim 11 further comprising a pulse generator coupled to said conductor, said pulse generator configured to apply said second potential to said conductor as a train of pulses.

* * * * *